Dec. 16, 1952 — J. N. VICTOR — 2,621,583
AUTOMATIC POP-UP TOASTER
Filed Feb. 24, 1947 — 3 Sheets-Sheet 1
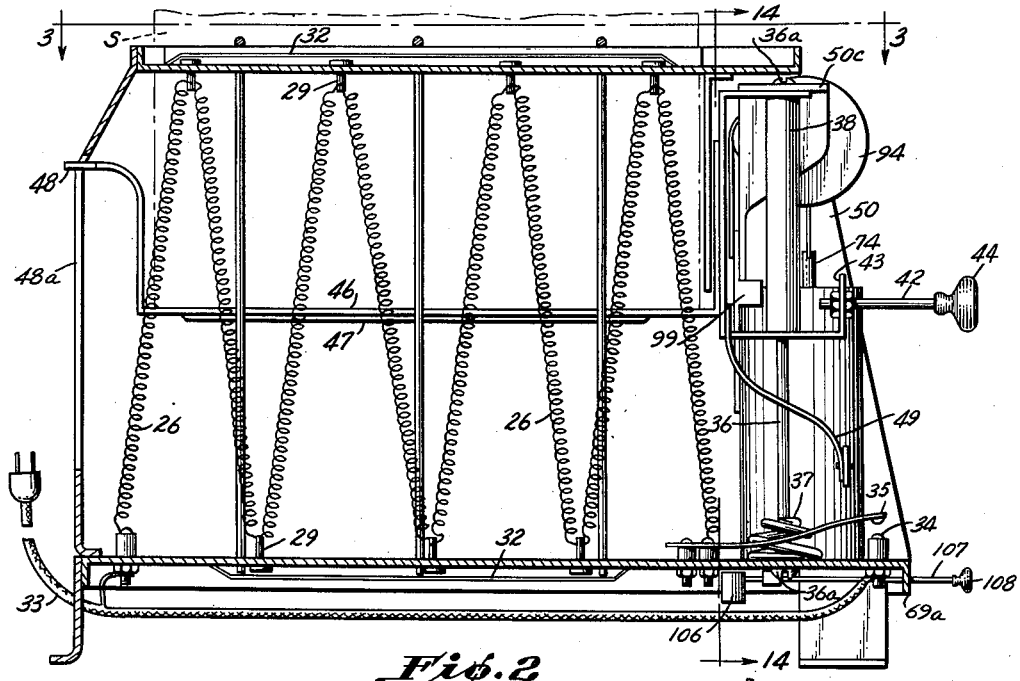
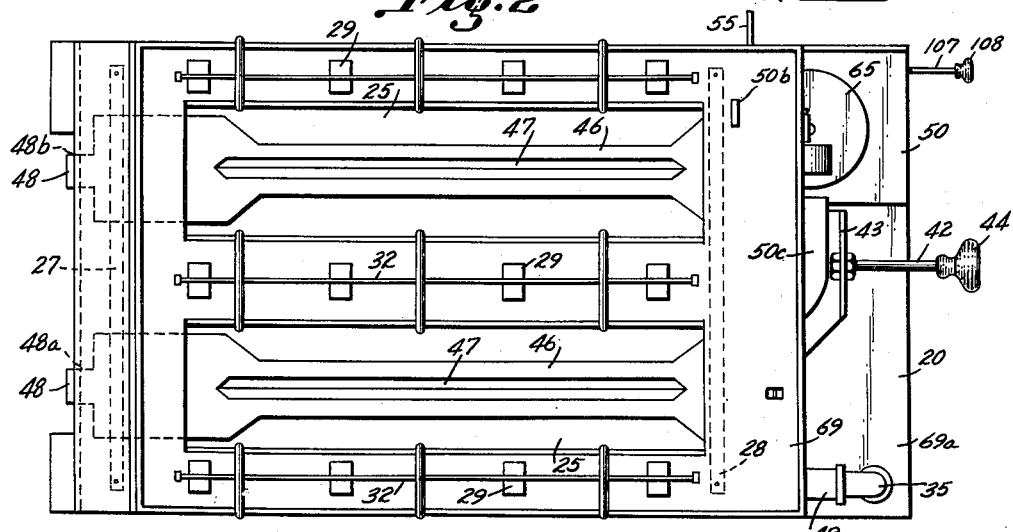
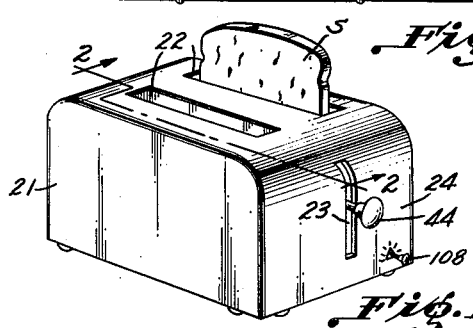
Inventor:
JOSEPH N. VICTOR
By Leonard L. Kalish
Attorney Dec. 16, 1952      J. N. VICTOR      2,621,583
AUTOMATIC POP-UP TOASTER
Filed Feb. 24, 1947      3 Sheets-Sheet 2
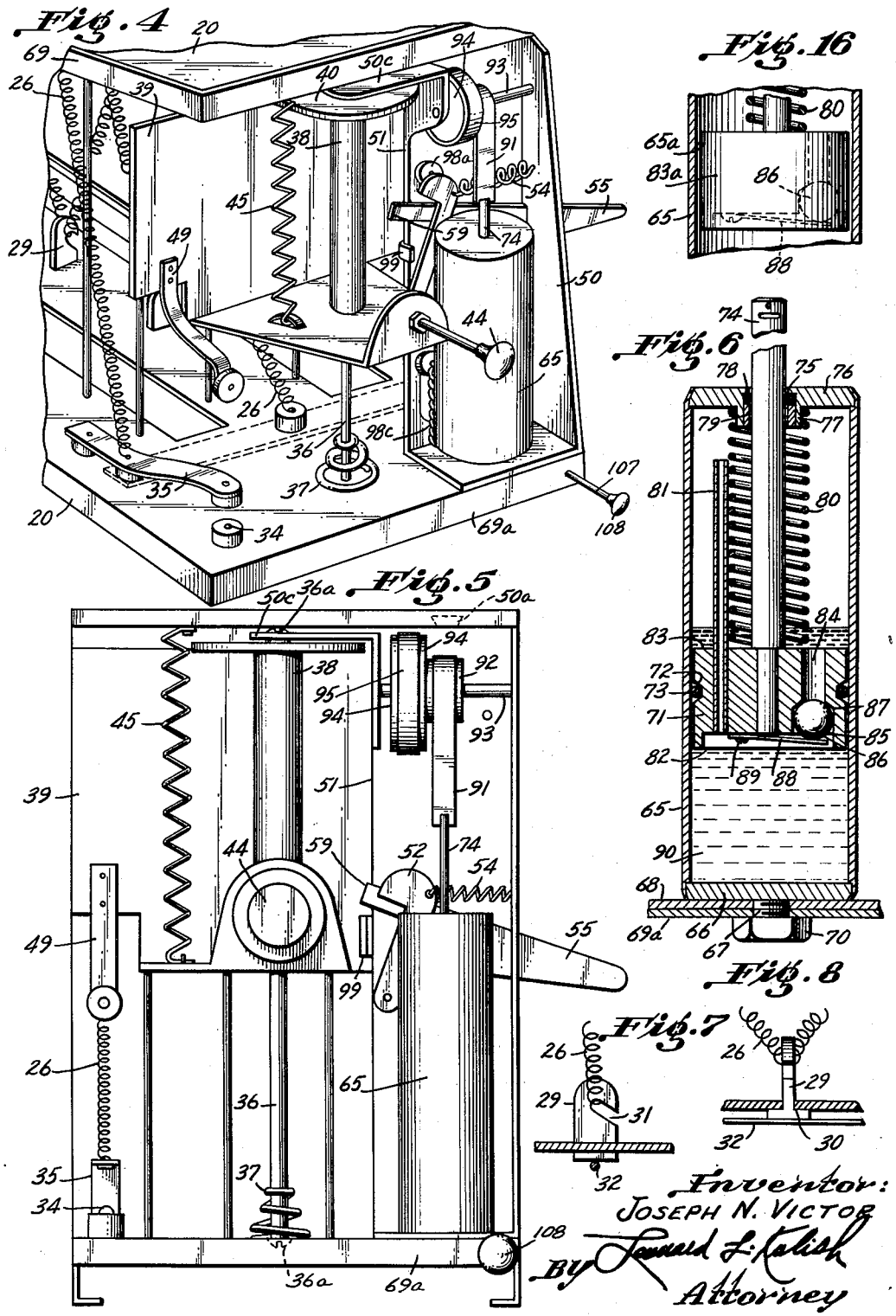

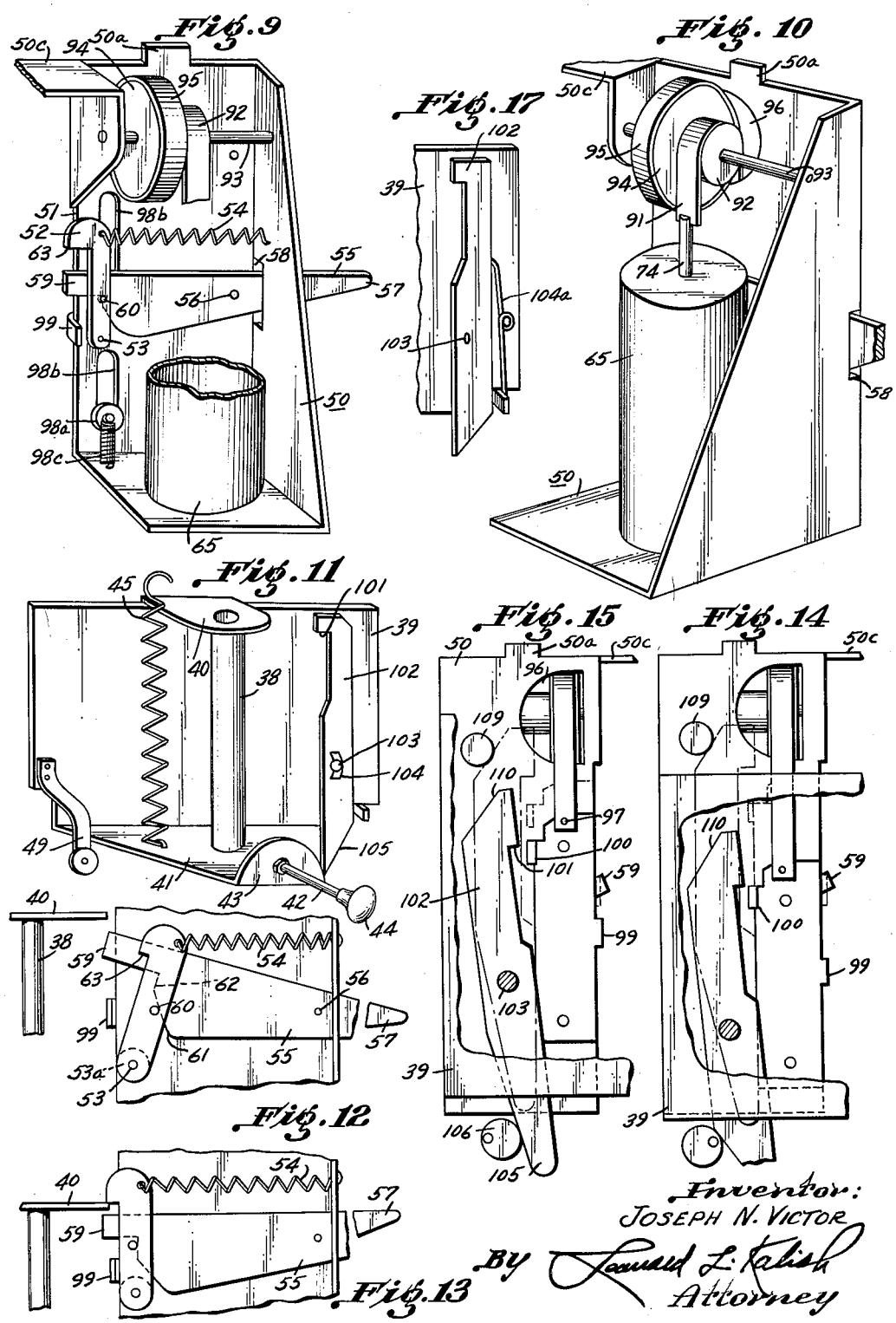

Patented Dec. 16, 1952

2,621,583

UNITED STATES PATENT OFFICE 2,621,583

AUTOMATIC POP-UP TOASTER

Joseph N. Victor, Allentown, Pa., assignor to Lasko Metal Products, Inc., West Chester, Pa., a corporation of Pennsylvania Application February 24, 1947, Serial No. 730,385

5 Claims. (Cl. 99—327)

The present invention relates to toasters or the like and it relates more particularly to automatic "pop-up" electric toasters wherein mechanism is provided for automatically raising the toast from within the heating compartment, at the end of a predetermined heating interval and for simultaneously opening the heating circuit.

An object of the present invention is to provide a new and improved construction for toasters or the like. Another object of the present invention is to provide a toaster construction having new and improved timing and latching mechanism. Still another object of the present invention is to provide a new and improved automatic "pop-up" toaster having simple, dependable and durable timing mechanism which does not require clock-work for its operation and which is substantially unaffected by the temperature variations normally encountered during use of the heater. A further object of the present invention is to provide new and improved latching mechanism for an automatic toaster or the like which will lock the toast-carrying support or carriage in position inside the toaster and which will automatically release said support or carriage at the end of a predetermined heating period. A still further object of the present invention is to provide novel means for regulating the heating period of an automatic "pop-up" toaster or the like.

Other objects and advantages of the present invention are apparent in the following detailed description, appended claims and accompanying drawings.

Automatic "pop-up" toasters (of the type wherein one or more slices of bread are adapted to be inserted through top openings in toaster and to be positioned upon vertically movable supports or carriages which are then moved downward manually to lower the bread into the heating compartment and which are spring-urged upwardly so that they automatically move upward, at the end of a predetermined toasting period, under the action of a timing device and associated latching mechanism) have heretofore generally been provided with conventional "clock-work" timers which have been loaded during the manual depressing operation and have thereafter released the movable toast-carriage.

However, these conventional "clock-work" timers have not been entirely satisfactory since they are relatively complicated and costly and frequently get out of order and fail, due primarily to the relatively large temperature variations necessarily encountered before, during and after each toasting operation. Accordingly, it is an object of the present invention to provide a new and improved toaster which eliminates the objections heretofore encountered with clock-work-timed devices and which is operated by a simple, dependable and relatively inexpensive timer working on a hydraulic principle.

The present invention further contemplates the provision of new and improved latching mechanism for use with these automatic "pop-up" toasters which has positive and dependable locking and releasing action and which can be readily adjusted to vary the duration of the timing.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

Referring to the accompanying drawings, in which like reference characters indicate like parts throughout:

Figure 1 represents a perspective view of one embodiment of the present invention.

Figure 2 represents a vertical cross-sectional view generally along the line 2—2 of Figure 1 but with the outer decorative cover or casing removed.

Figure 3 represents a horizontal cross-sectional view generally along the line 3—3 of Figure 2.

Figure 4 represents a fragmentary perspective view, on an enlarged scale, looking generally in the same direction as Figure 1, but showing the various parts of the toaster, as they appear with the outer cover or casing removed.

Figure 5 represents an end elevational view looking generally in from the open end of Figure 4.

Figure 6 represents a vertical cross-sectional view of the timing unit forming part of the embodiment of Figures 1–5.

Figures 7 and 8 are elevational views, taken at right angles to each other, showing the method of anchoring the coiled heating wire.

Figure 9 represents a fragmentary perspective view showing the latching mechanism forming part of the present invention;—parts being broken away better to reveal the construction thereof.

Figure 10 represents a fragmentary perspective view, taken generally at right angles to that of Figure 9.

Figure 11 represents a perspective view of the movable end-plate forming part of the embodiment of Figures 1–10.

Figure 12 represents a more or less schematic fragmentary view showing the latching mechanism in open position.

Figure 13 represents a view generally similar to that of Figure 12 showing the latching mechanism in closed position.

Figure 14 represents a view looking generally along the line 14—14 of Figure 2 showing the lowermost position of the movable end-plate when the toaster is set for "dark" toast;—parts being broken away better to reveal the construction thereof.

Figure 15 represents a view generally similar to that of Figure 14 but showing the position of the end plate when the toaster is set for "light" toast.

Figure 16 represents a fragmentary view, partly in vertical cross-section and partly in elevation, showing a modified form of hydraulic timing mechanism.

Figure 17 represents a fragmentary perspective view generally similar to that of Figure 11 but showing a modified construction wherein a spring is used to urge the lever 102 toward engaging position.

In one embodiment of the present invention shown generally in Figures 1-3, I may provide a toaster having a suitable metal frame 20 about which an outer decorative case or jacket 21 is adapted to be positioned in more or less conventional manner.

The case 21 is provided with a pair of elongated top openings 22 through which slices of bread S are adapted to be inserted in conventional manner, as indicated in Figure 1.

The case 21 is also provided with a vertical slot 23 in its front wall 24, the function of which will be described hereinbelow.

The frame 20 is provided with a pair of side-by-side toasting chambers 25 which extend downward from the openings 22 and which are adapted to be heated by three rows 26 of coiled heating wire;—the rows extending along the outer sides of the chambers 25 and intermediate said chambers, as indicated particularly in Figure 3.

Each of the rows 26 extends from the bottom to the top of the frame 20 in zig-zag fashion, as shown particularly in Figure 2;—the ends of the rows 26 being connected in parallel by conductor elements 27 and 28. The rows 26 are supported upon spaced insulators 29, as shown particularly in Figures 2, 7 and 8. The insulators 29 extend through slots formed in the top and bottom of the frame 20 are provided with enlarged retaining heads 30 and inclined slots or notches 31 through which the rows 26 extend as shown particularly in Figures 7 and 8.

While the insulators 29 are retained in position within the frame 20 by the natural resilience of the rows 26, it may be desirable to provide additional retaining wires 32 which pass across the heads 30 as shown in Figures 2, 3, 7 and 8. The retaining wires 32 serve particularly to minimize any lowering of the bottom insulators 29 resulting from expansion of the rows 26.

An electrical lead-in cord 33 is adapted to be plugged into any source of alternating or direct current and is connected to the conductors 27 and 28 as shown particularly in Figure 2, so as to provide current for the rows 26 of heating wire.

A make-and-break switch is provided for the conductor element 28;—the switch having a fixed contact 34 and a resilient movable contact 35 normally tensioned to open position and adapted to be moved to closed position as will be hereinafter described.

A post 36 is fastened to the lower wall 69-a by a bolt 36-a and extends upwardly therefrom. The upper end of the post 36 is fastened to an extension 50-c of a structural member 50 (to be hereinafter described) by another bolt 36-a. The upper wall 69 of the toaster frame is not connected in any way to the post 36 and is thus free to move (under expansive and contractive forces generated during temperature changes) without causing tilting or other undesirable shifting of the post 36.

A sleeve 38 is slidably mounted on the post 36 and carries a generally vertical plate 39 which is spaced somewhat from said sleeve 38 by integrally-formed horizontally-extending top and bottom flanges 40 and 41 respectively.

An operating rod or shaft 42 extends outwardly from the upturned free end 43 of the bottom flange 41;—the rod 42 extending through the front slot 23 in the case 21 and being provided with an outer knob 44.

A coil spring 45 is fastened, at one end, to the bottom flange 41 and is fastened at its other end to the top of the frame 20 as shown particularly in Figures 4 and 5;—the coil spring serving to tension the sleeve 38 and the plate 39 upwardly within the frame 20.

A pair of elongated bread-supporting strips 46 are fastened, at their front ends, to the plate 39 and extend therefrom along the toasting chambers 25;—the strips 46 being provided with stiffening ribs 47 and having upturned rear ends 48 which serve to retain and position the slices of bread S as indicated particularly in Figure 2.

The rear ends 48 of the bread-supporting strips 46 pass through vertical slots 48-a formed in the back wall of the toaster frame so as to provide guidance for the strips 46 during up-and-down movement thereof.

From the foregoing it is apparent that, when the knob 44 is manually depressed, the sleeve 38, the plate 39 and the bread-supporting strips 46 will all be moved downward so as to lower the slices S until they are fully enclosed within the toasting chambers 25. It is also apparent that, when released, the assembly will be moved upward by the spring 45 to the uppermost position shown in Figure 2, wherein the slices S protrude upward through the openings 22, to permit their ready removal.

The plate 39 is provided with a downwardly-extending finger 49 which is adapted to force the movable switch contact 35 downward, when the plate 39 is lowered, so as to close the heating circuit to the rows of heating wire 26. When the plate 39 is moved upward, the finger 49 is moved away from the movable switch contact 35 which then opens, as shown in Figure 2, due to its resilience.

The bumper-spring 37 serves to cushion the downward movement of the bottom flange 41.

Latching mechanism for locking the plate 39 in its lowermost position and for releasing said plate, will now be described.

A structural member 50, shown particularly in Figures 9 and 10, is set into the front end of the frame 20 as shown in Figure 4. A locking tab 50-a is formed at the top of the member 50 as shown in Figures 9 and 10 and is adapted to be inserted into and crimped over a corresponding slot 50-b formed in the top wall 69 of the frame 20. The inner vertical edge 51 of the structural member 50 extends in line with and closely adjacent the side of the top flange 40 as shown particularly in Figure 5;- the right-hand edge of the bottom flange 41 being spaced somewhat away from the edge 51 as also shown in Figure 5.

A latching ear 52 is pivoted, at its lower end, as at 53, upon the structural member 50 adjacent the inner edge 51 thereof;- a spacing member 53-a serving to space the ear 52 somewhat apart from the structural member 50 as shown particularly in Figure 9. A coil spring 54 normally tensions the latching ear 52 to the retracted non-locking position shown in Figure 12.

An operating member or trip-member 55 is pivoted upon the structural member 50 as at 56 at a point substantially removed from the inner edge 51 thereof. The outer end 57 of said member 55 extends through an opening 58 in said structural member 50 and through an aligned opening (not shown) in the case 21 for manual operation.

The innermost end 59 of the member 55 extends intermediate the ear 52 and the member 50 and protrudes beyond the inner edge 51 as shown particularly in Figures 9, 12 and 13.

The latching ear 52 is provided with a pin 60 generally intermediate its ends.

The operating member 55 is provided with an inclined camming edge 61 and a vertical locking edge 62.

When the operating member or trip-member 55 is in the position shown in Figure 12 (that is, with its outer end 57 depressed as far as is permitted by the opening 58) the pin 60 of the latching ear 52 bears against the camming edge 61 under the tension of the spring 54. When the operating member 55 is rotated counterclockwise about its pivot 56 from the position shown in Figure 12 to that shown in Figure 13, it is apparent that the camming edge 61 will move the pin 60 so as to swing the latching ear counterclockwise against the tension of the spring 54, to the generally upright vertical position shown in Figure 13, wherein the pin 60 bears against the vertical locking edge 62 (the counterclockwise movement of the member 55 being limited by the contact of the lower edge of the inner end 59 with the pin 60) and wherein the locking jaw 63 of the latching ear 52 extends beyond the inner edge 51 of the structural member 50, as indicated in Figures 9 and 13.

The latching mechanism described above is adapted automatically to lock the plate 39 and its associated strips 46 in lowermost position as will now be described.

With the latching mechanism in the open position shown in Figure 12 and with the plate 39 in uppermost position as shown in Figures 4 and 5, downward movement of the plate 39 (upon downward manual movement of the knob 44) will cause the right-hand edge of the top flange 40 to strike the protruding portion of the inner end 59 of the operating member 55. Further downward movement of the flange 40 will cause the operating member 55 to rotate counterclockwise as described above so as to force the latching ear 52 to the position shown in Figure 13 wherein its locking jaw 63 extends beyond the inner edge 51 and above the right-hand edge of the top flange 40 so as to prevent the flange 40 and the plate 39 from moving upward.

Thus, the plate 39 and the bread-supporting strips 46 are locked in their lowermost position, with the heating circuit closed, so as to toast the bread slices S.

The operating member or trip-member 55 remains in the locking position shown in Figure 13 until it is released either manually (by a downward clock-wise movement of the outer end 57) or automatically by a timing mechanism which will be hereinafter described.

I prefer to provide the toaster of the present invention with new and improved automatic timing mechanism as shown particularly in Figures 4, 5 and 6.

The timing mechanism includes a cylinder 65 mounted upon the structural member 50; the bottom wall 66 of said cylinder 65 being provided with a screw-threaded bolt 67 which extends downward through aligned openings in the bottom wall 68 of the structural member 50 and the bottom wall 69-a of the frame 20 and which is adapted to receive a nut 70 so as to lock said cylinder 65 and said member 50 to the frame 20.

A piston 71 is movably mounted within the cylinder 65; the piston 71 being provided with a peripheral groove 72 in which is disposed an annular oil seal 73. The oil seal 73 may be formed of any appropriate resilient compressible material, such as rubber or synthetic resin or the like so as to provide a fluid-tight seal intermediate the piston 71 and cylinder 65, and thereby to eliminate the need for accurately dimensioning the piston 71 to fit snugly within the cylinder. That is, with the oil seal 73, the piston 71 can be given a diameter appreciably less than the bore of the cylinder so as to substantially reduce the cost of manufacture.

A rod 74 extends upward from the piston 71 and protrudes from the top of the cylinder 65; the rod 74 passing through a central opening 75 in the top wall or cover 76 of said cylinder 65.

An annular collar 77 depends from the wall 76 and is adapted to receive an oil seal 78 which is held in place by a retainer ring 79 so as to provide a fluid-tight seal intermediate the piston rod 74 and said top wall 76.

A helical compression spring 80 is disposed about the piston rod 74 intermediate the collar 77 and the piston 65; the spring 80 tending to urge said piston 71 downward within the cylinder 65.

A capillary tube 81 extends upward from the bottom wall 82 of the piston 71 to a point substantially above the top wall 83 of said piston 71.

The piston 71 is also provided with a check-valve which permits flow of fluid downward therethrough but which prevents upward flow of fluid therethrough.

The piston check-valve includes a conduit 84 extending downward from the top wall 83 of said piston. The bottom end of said conduit is enlarged as at 85 to accommodate a check-ball 86 which is adapted to cooperate with a frusto-conical valve seat 87.

A resilient ball-retainer 88, which may be made of a strip of beryllium copper or the like, is riveted at one end, as at 89 to the bottom wall 82 of the piston 71. The free end of said ball-retainer 88 is adapted to bear against the check-ball 86 and to maintain it within the enlarged lower end 85 of the conduit 84. It is apparent that, normally, the ball-retainer 88 maintains the check-ball 86 firmly in contact with the valve seat 87 so as to maintain a fluid-tight seal therebetween. However, when sufficient fluid pressure is applied at the upper open end of the conduit 84, the check-ball 86 will be moved downward against the tension of the ball-retainer 88 so as to permit flow of fluid downward through said conduit 84 from the top to the bottom of said piston 65.

The cylinder 65 is adapted to contain hydraulic fluid 90 to a level preferably somewhat below the lowermost position of the upper end of the capillary tube 81 but above the uppermost position of the top wall 83 of the piston 71, as indicated particularly in Figure 6.

It is apparent that, when the piston rod 74 and the piston 71 are raised (against the tension of the compression spring 80) some of the hydraulic fluid will be transferred from above to below said piston 71, through the conduit 84 and past the check-ball 86, as described hereinabove. If the piston rod 74 is then released, the compression spring 80 will tend to drive the piston 71 back toward the lower end of the cylinder 65. However, the rate of descent of the piston 71, under the pressure of the spring 80, is governed by the rate at which the hydraulic fluid can by-pass the piston 71 through the capillary tube 81.

That is, if the capillary tube 81 is given a relatively large bore or if the hydraulic fluid has a relatively low viscosity, the fluid will pass upward through the capillary tube at a relatively rapid rate so as to permit the piston 71 to descend at somewhat greater speed. On the other hand, if the capillary tube 81 is given a relatively small bore or if the hydraulic fluid has a relatively high viscosity, the rate of passage of fluid upward through said tube 81 is relatively low and the rate of descent of the piston 71 is correspondingly less.

It is apparent that the bore of the capillary tube 81 and the viscosity of the hydraulic fluid 90 can be adjusted to give any desired relationship of time-to-stroke. By way of illustration, the capillary tube and the hydraulic fluid can be selected so as to require four minutes for a one-inch stroke of the piston 71 and two minutes for a half-inch stroke.

The hydraulic fluid 90 is preferably one whose viscosity decreases relatively slowly and uniformly (without any sharp break in viscosity) with rise in temperature. One hydraulic fluid which has been found to give satisfactory results is a silicone oil (whose viscosity decreases generally uniformly from a value of about 300 centistokes at 0° F. to about 40 centistokes at 200° F.).

The hydraulic timer is so arranged that the fluid 90 slowly rises in temperature as the toaster is used. This results in a corresponding drop in viscosity of the fluid and a corresponding decrease in the timing interval with any given setting of the adjusting knob 108, to be hereinafter described.

This gradual decrease in timing interval with prolonged use of the toaster compensates for the increase in toasting temperature during such prolonged operation.

Thus, it is apparent that, if the timing period were fixed, regardless of the extent of the use of the toaster, successive pieces of toast would become darker.

In other words, when the first piece of bread is toasted, the toaster is relatively "cool" so that, with a given timing period, the toast may come out "light." With the next piece of toast (assuming that the toaster is not turned off between toasting operations), the toaster will be at a higher temperature to begin with so that, with the same timing period, the toast may come out "medium." After three or four toasting operations, the toaster may be so "hot" that the same timing interval which gave "light" toast originally will give "dark" toast.

Thus, the gradual and generally uniform viscosity decrease of the hydraulic fluid 90 compensates for this tendency to give successively darker pieces of toast, by causing gradual decrease in the timing period, with any given setting of the adjusting knob 108.

In this way, the last piece of toast will be just about the same as the first piece of toast since it will have been heated at the higher temperature for a shorter time.

A flexible tape 91 of metal or the like is fastened to the upper end of the piston rod 74 and extends upward therefrom;—the other end of said tape passing over and being fastened to a relatively small pulley 92 mounted on a shaft 93 having its ends supported upon said structural member 50 adjacent the upper end thereof.

A larger pulley 94 is mounted upon said shaft 93 in juxtaposition to the pulley 92;—the pulleys 92 and 94 being keyed for rotation together. A tape 95 is fastened at one end to the pulley 94 and extends thereover and through an opening 96 formed in the structural member 50;—the other end of said tape 95 extending downward behind said structural member 50 and being fastened, as at 97, to the upper edge of a movable plate or trip-member 98, as shown particularly in Figures 2, 14 and 15.

The plate 98 is provided with a pair of headed rivets 98–a which extend through vertically-aligned slots 98–b formed in the structural member 50 so as to guide said plate 98 during its up-and-down movement. A coil spring 98–c may be fastened at one end to the lower rivet 98–a and at the other end to the bottom wall of the structural member 50 so as to urge the plate 98 to its lowermost position and thereby to maintain the tapes 91 and 95 relatively taut. If desired, however, the spring 98–c can be eliminated and the weight of the plate 98 can be utilized for maintaining the tapes 91 and 95 taut.

The plate 98 is provided with a tab 99 which is bent around the inner edge 51 of the structural member 50. As shown particularly in Figures 4, 5 and 9, the tab 99 is in vertical alignment with the inner end 59 of the operating member 55 so that upward movement of the plate 98 will cause the tab 99 to raise said inner end 59 and thereby to rotate the operating member 55 counterclockwise so as to release the latching ear 52 in a manner hereinabove described.

The opposite edge of the plate 98 is provided with a rearwardly-bent lug 100. The free end of the lug 100 is in vertical alignment with the jaw 101 of a lever 102 which is pivoted as at 103 intermediate its ends upon the front of the movable plate 39, as shown particularly in Figure 11. The pivot 103 is provided with a spring 104 which bears against the lever 102 and presses it against the plate 39 so as to keep it from turning too freely, while permitting it to turn under the camming action to be hereinafter described.

The lower end of the lever 102 extends downward beyond the lower edge of the plate 39 and is provided with an inclined camming shoulder 105 which is in operative juxtaposition to a rotatable eccentric or cam 106 carried by a shaft 107 mounted on the frame 20 and extending forwardly therefrom as shown particularly in Figures 4, 14 and 15. The forward end of the shaft 107 is provided with an adjusting knob 108 which is disposed on the outside of the outer case 21 as shown particularly in Figure 1.

When the lever 102 is in the upright position shown in dash-dot lines in Figure 15, it overlies the lug 100, so that downward movement of the plate 39 will cause the jaw 101 to engage the lug 100 and to move the plate 98 downward with the plate 39, thereby to rotate the pulleys 92 and 94 so as to raise the piston rod 74 and the piston 71, and to load the spring 80.

The plate 98 will be carried downward with the plate 39 until the lower camming shoulder 105 of the lever 102 strikes the cam 106. Further downward movement of the plate 39 and the lever 102 will cause the lever to rotate (counterclockwise in Figure 15) to the position shown in solid lines wherein the jaw 101 is moved away from the lug 100 of the plate 98. Thereafter, the plate 39 and the lever 102 will move downward free of the plate 98 which remains momentarily at the level at which disengagement of the jaw 101 occurred.

It is apparent that the position of the eccentric or cam 106 determines the point of disengagement of the lever 102. Thus, with the cam 106 in the position shown in Figure 15, the inclined shoulder 105 will strike the cam relatively soon during downward movement of the plate 39 and the lever 102 so as to cause early release of the plate 98 and a correspondingly small raising of the piston rod 74. On the other hand, when the cam 106 is rotated 180° to the position shown in Figure 14, the plate 39 and the lever 102 must move downward substantially further before the inclined shoulder 105 strikes the cam 106 so as to disengage the jaw 101—thereby resulting in a greater lowering of the plate 98 and a correspondingly greater elevation of the piston rod 74.

A re-set pin 109 is provided on the back side of the structural member 50, generally in vertical alignment with an inclined camming shoulder 110 formed at the top of the lever 102. When the plate 39 and the lever 102 move upward under the tension of the spring 45, the upper shoulder 110 strikes the re-set pin 109 so as to force the lever (clockwise in Figures 14 and 15) from the tilted solid-line position to the upright dash-dot line position wherein it is again ready to engage the lug 100 upon downward movement of the plate 39 and the lever 102.

From the foregoing, it is apparent that rotation of the adjusting knob 108 will give "Light" or "Dark" toast by regulating the timing period.

Thus, if the knob 108 is set in the "Light" position corresponding to the cam setting shown in Figure 15, downward movement of the knob 44 and the plate 39 and the lever 102 will carry the plate 98 along only to the position shown in Figure 15 (at which point the jaw 101 disengages). In this position, the tab 99 is only a relatively slight distance below the inner end 59 of the trip-member or operating member 55. In this position, too, the piston 71 has been raised only a relatively small distance within the cylinder 65, before it begins its return downward movement under the pressure of the spring 80. During this downward movement of the piston 71 and its piston rod 74, the tape 91 is pulled down and the tape 95 is pulled up so as gradually to raise the plate 98 to the point at which the tab 99 strikes the inner end 59 of the trip-member 55 and rotates said member 55 to release the latching ear 52 and to permit plate 39 and its associated bread-supporting strips 46 to move upward under the tension of the spring 45, so as to raise the bread to the protruding position shown in Figure 1 and simultaneously to open the heating circuit.

On the other hand, when the adjusting knob 108 is set in the "Dark" position corresponding to the cam setting shown in Figure 14, the plate 98 is carried substantially further downward before the lever jaw 101 is released, so that the tab 99 is further below the end 59 when it starts its upward movement, corresponding to the downward movement of the piston 71 and the piston rod 74. This results in a greater time interval elapsing before the tab 99 strikes the inner end 59 and releases the plate 39, and thereby results in a longer heating period and darker toast.

It is apparent that the adjusting knob 108 can be set at any position intermediate the extremes shown in Figures 14 and 15 so as to provide an adjustable timing and toasting period, corresponding to the inividual taste of the user.

As described hereinabove, the gradual drop in viscosity of the hydraulic fluid 90 during continued use of the toaster, causes a gradual drop in the timing period with any given setting of the adjusting knob 108 so that substantially the same degree of toasting is maintained, regardless of how long the toaster is used.

In Figure 16 there is shown a modified form of the timing mechanism which generally resembles that of Figure 6 except that the piston 83–a, instead of being provided with a capillary tube 81 and an oil seal 73, is simply made somewhat smaller in diameter than the inside of the cylinder 65.

This results in a slight radial clearance 65–a intermediate the piston and the cylinder so as to provide an annular by-pass for the hydraulic fluid during downward movement of the piston 83–a, under pressure of the spring 80.

For example, when silicone oil, of the type described herein, is used as a fluid, a radial clearance of about .003" has been found to give satisfactory results.

Of course, the check-ball 86 and spring 88 are provided within the piston 83–a to permit ready return of the piston during upward "loading" movement thereof.

In Figure 17 there is shown a modified construction for the lever 102. In this modification, the lever 102 is mounted so as to swing freely on its pivot 103 (the spring 104 being eliminated) and a spring 104–a is mounted on the front of the plate 39 so as to urge the lever 102 (counterclockwise in Figure 17) to the upright engaging position wherein its jaw 101 is in line with the lug 100 of the plate 98 (the position shown in dash-dot lines in Figure 15).

In the embodiment of Figure 17, the re-set pin 109 and the upper camming shoulder 110 are eliminated. Instead of relying on the camming action of the pin 109 and the shoulder 110 to return the lever 102 to the upright engaging position shown in dash-dot lines in Figure 15, the embodiment of Figure 17 utilizes the spring 104–a which automatically swings the lever 102 to the upright position as soon as the lower shoulder 105 clears the lower cam 106 during upward movement of the plate 39. Of course, when the shoulder 105 strikes the cam 106 on the downward stroke, the lever 102 will be cammed to the inclined disengaging position shown in solid lines in Figure 15 (against the pressure of the spring 104–a).

From the foregoing it is evident that the novel latching mechanism of the present invention provides a simple and inexpensive construction which is positive in operation and which has a minimum of springs and other moving parts and which is, thereby, correspondingly long-lived and less prone to failure.

It is also apparent that the novel timing mechanism forming part of the present invention is simple and dependable in operation and works positively, in conjunction with the latching mechanism, to insure release of the bread-carrying members and opening of the heating circuit, at the desired time. As indicated hereinabove the novel timing mechanism of the present invention eliminates clock-work, or electric-motor timers which are notoriously prone to failure and deviation from the necessary standard of accuracy.

The timing mechanism of the present invention, being a sealed, self-contained unit employing a hydraulic fluid whose viscosity does not appreciably vary with temperature or with age, is substantially fool-proof and will last indefinitely. Thus, inasmuch as the unit is completely sealed, there is no danger of clogging or otherwise obstructing the capillary tube. As stated hereinabove, the piston oil ring provides a fluid-tight seal without the necessity for expensive and time-consuming grinding of the piston 71. There is virtually no wear upon the oil ring so that the timing unit will last indefinitely without leakage such as might alter the timing interval.

The novel check-valve construction forming part of the timer is also simple and inexpensive to manufacture and assemble, and eliminates the need for accurately-machined moving parts.

Similarly, the upper oil seal 78 for the piston rod 74 eliminates the need for complicated and relatively expensive stuffing boxes or the like.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described my invention, I claim as new and desire to protect by Letters Patent:

1. In an automatic pop-up toaster; a frame; a bread carrying plate constructed and arranged for up-and-down movement within said frame and normally urged to upper position; and latching means for automatically engaging and retaining said plate in lower position, said latching means including a pivoted latching-ear normally spring urged toward non-locking position, a pivoted manually releasable operating member adapted to be tilted to a position substantially at a right-angle to said latching ear to cam said latching-ear into locking position engaging said plate, a cam on said operating member and a cam-follower on said latching-ear in operative engagement with said cam, said operating member being disposed substantially parallel to the line of force of the spring which urges said latching-ear into non-locking position when said latching-ear is in locking position, and connecting means intermediate said plate and said operating member for tilting said member upon downward movement of said plate.

2. In an automatic pop-up toaster; a frame; a bread-carrying plate constructed and arranged for up-and-down movement within said frame, a spring urging said plate to upper position; and latching means for automatically engaging and retaining said plate in lower position, said latching means including a pivoted latching-ear, a spring urging said latching ear toward non-locking position, a pivoted manually releasable operating member mounted in operative juxtaposition to said latching ear and having a camming surface adapted to move said latching ear into locking position upon tilting of said operating member, said operating member having a protruding portion adapted to be contacted by said plate during downward movement thereof thereby to tilt said operating member to a position substantially at a right-angle to said latching ear to cam said latching-ear into locking position relative to said plate, a cam on said operating member and a cam-follower on said latching-ear in operative engagement with said cam, said operating member being disposed substantially parallel to the line of force of the spring which urges said latching-ear into non-locking position when said latching-ear is in locking position.

3. An automatic pop-up toaster according to claim 1 in which there is a timing mechanism constructed and arranged automatically to release said latching means after said plate has remained in lower position for a predetermined time interval; said timing mechanism including a cylinder containing hydraulic fluid, a piston movably mounted within said cylinder, a spring normally urging said piston toward one end of said cylinder, said piston being slightly undersize relative to said cylinder thereby to provide an annular by-pass permitting only restricted flow of fluid across said piston and correspondingly slow movement of said piston under the influence of said spring, a check-valve carried by said piston and permitting ready return of fluid during opposite movement of said piston, means for loading said piston during downward movement of said bread-carrying plate, and means actuated by movement of said piston for tilting said operating member to latching-ear-releasing position when said piston reaches predetermined position under influence of said spring.

4. An automatic pop-up toaster according to claim 3 in which the piston-loading means comprises a lug movable with the piston, a lever pivoted on the bread carrying plate, said lever having a jaw normally engaging the lug for downward movement therewith, a manually adjustable cam on the frame, and cam-following means on the lever adapted and arranged to disengage the jaw from the lug so that the piston is loaded only during that portion of the downward movement of the bread-carrying plate predetermined by the position of the manually adjustable cam.

5. A pop-up toaster according to claim 3 in which the hydraulic fluid is a silicone and in which the heat from continued use of the toaster decreases the viscosity of the silicone approximately sufficiently to shorten the timing action for approximately uniform toasting regardless of the period of operation of the toaster.

JOSEPH N. VICTOR.

REFERENCES CITED

The following references are of record in the file of this patent:

UNITED STATES PATENTS

| Number | Name | Date |
|---|---|---|
| 145,644 | Gibbs | Dec. 16, 1873 |
| 1,075,367 | Merritt | Oct. 14, 1913 |
| 1,959,935 | Shroyer | May 22, 1934 |
| 2,262,297 | Olson | Nov. 11, 1941 |
| 2,336,640 | Sardeson | Dec. 14, 1943 |
| 2,343,347 | Turner | Mar. 7, 1944 |
| 2,389,434 | Huck | Nov. 20, 1945 |
| 2,389,927 | Parr | Nov. 27, 1945 |
| 2,393,559 | Pappas | Jan. 22, 1946 |